Feb. 10, 1953 R. B. MACK 2,628,080
JACKETED CONICAL BLENDER
Filed Sept. 22, 1950 3 Sheets-Sheet 1

INVENTOR
Robert B. Mack
BY
ATTORNEY

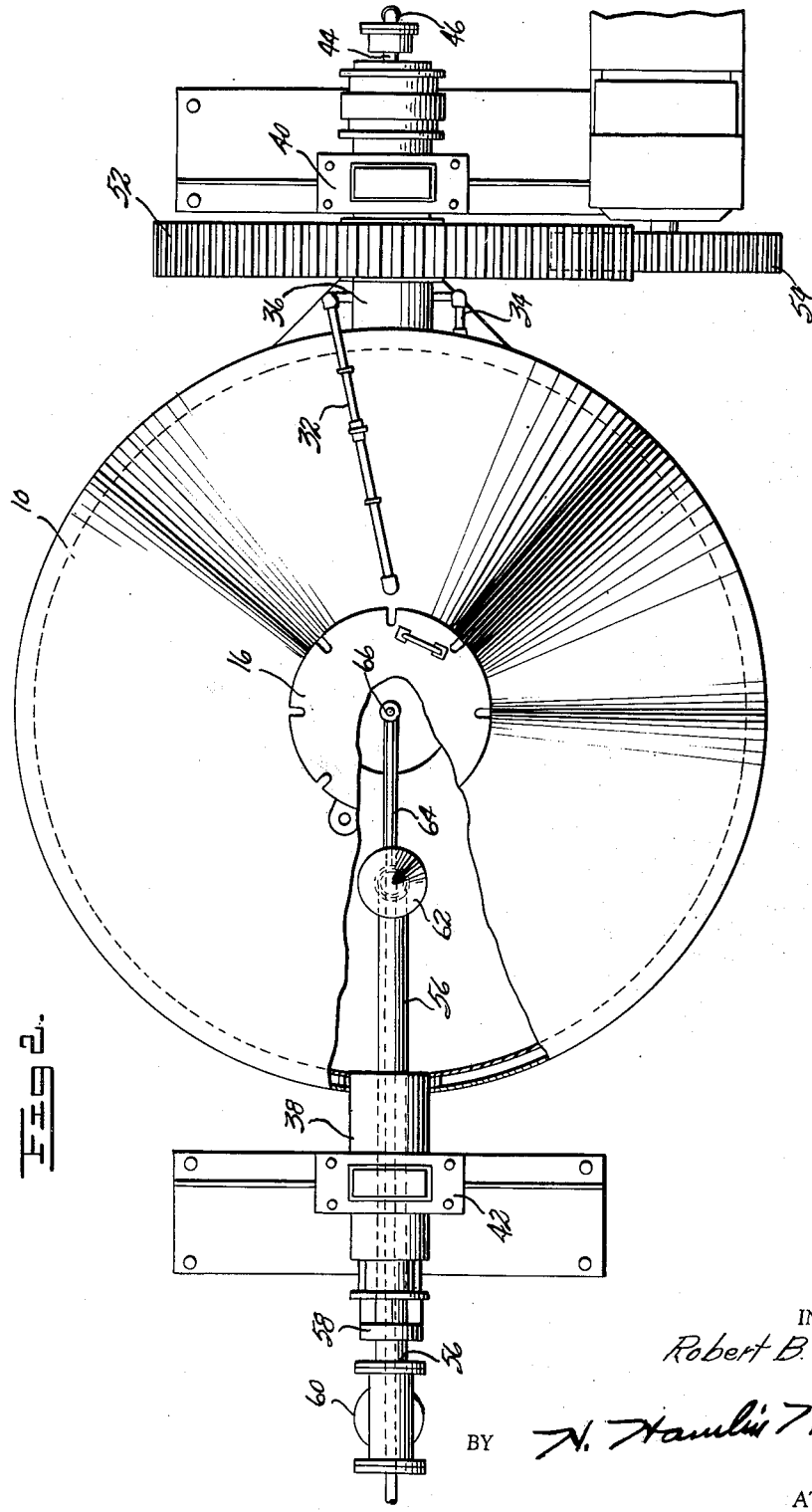

Feb. 10, 1953 R. B. MACK 2,628,080
JACKETED CONICAL BLENDER
Filed Sept. 22, 1950 3 Sheets-Sheet 3
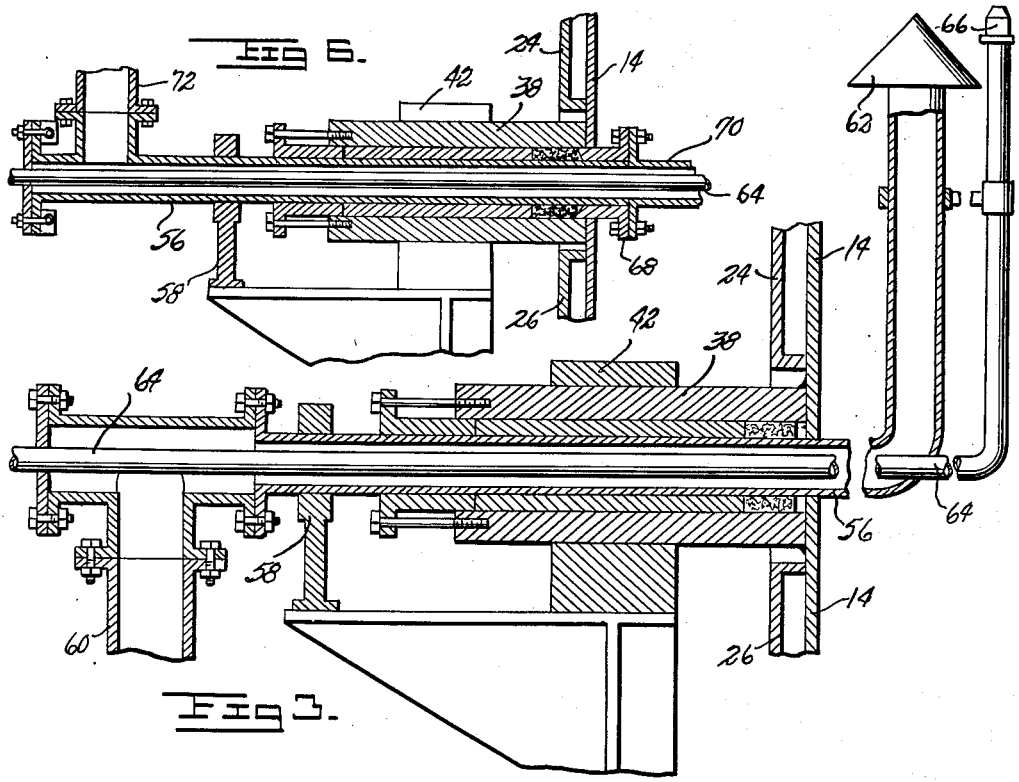
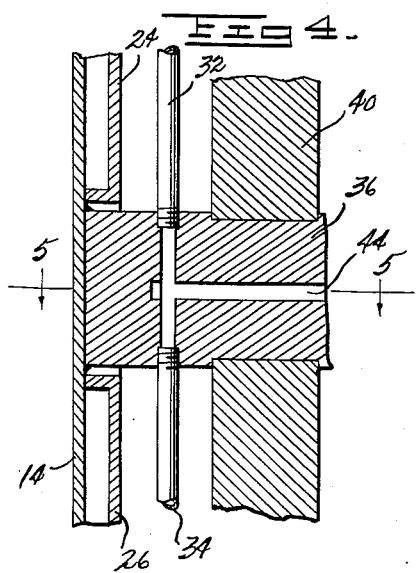
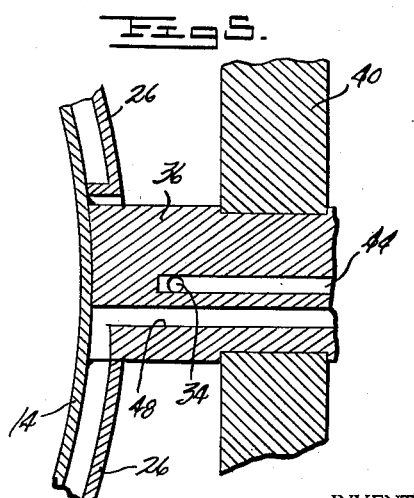
INVENTOR
Robert B. Mack
BY H. Hamlin Hodges
ATTORNEY Patented Feb. 10, 1953

2,628,080

UNITED STATES PATENT OFFICE 2,628,080

JACKETED CONICAL BLENDER

Robert B. Mack, East Liverpool, Ohio, assignor to The Patterson Foundry & Machine Co., East Liverpool, Ohio, a corporation of Ohio Application September 22, 1950, Serial No. 186,276

4 Claims. (Cl. 259—14)

Many mixers and blenders have been provided before, adapted to tumble ingredients within the mixer for purposes of dispersing in a liquid and/or dispersing a liquid into a dry material.

An object of my invention is to provide a dispersing mixer jacketed for heating and/or cooling purposes.

A further object is to provide a jacketed dispersing chamber provided with baffles within the jacket to increase the circulation of the heating or cooling media.

A still further object of my invention is to provide a mixing chamber into which liquid or gas may be injected during the dispersing process.

A still further object is to provide a jacketed blender having mounted therewithin a vacuum connection permitting the drawing of a vacuum within the blender while in operation.

In the drawings:

Fig. 2 is a plan view, partly broken away;

Fig. 3 is an enlarged vertical cross-section, partly broken away, through the trunnion on the left side of the mixer;

Fig. 4 is an enlarged vertical cross-section, partly broken away, on the right (drive) side of the mixer;

Fig. 5 is an enlarged horizontal cross-section, partly broken away, on the line 5—5 of Fig. 4; and Fig. 6 is an enlarged vertical cross-section similar to Fig. 3 but of a modified form, and partly broken away.

Figure 1:
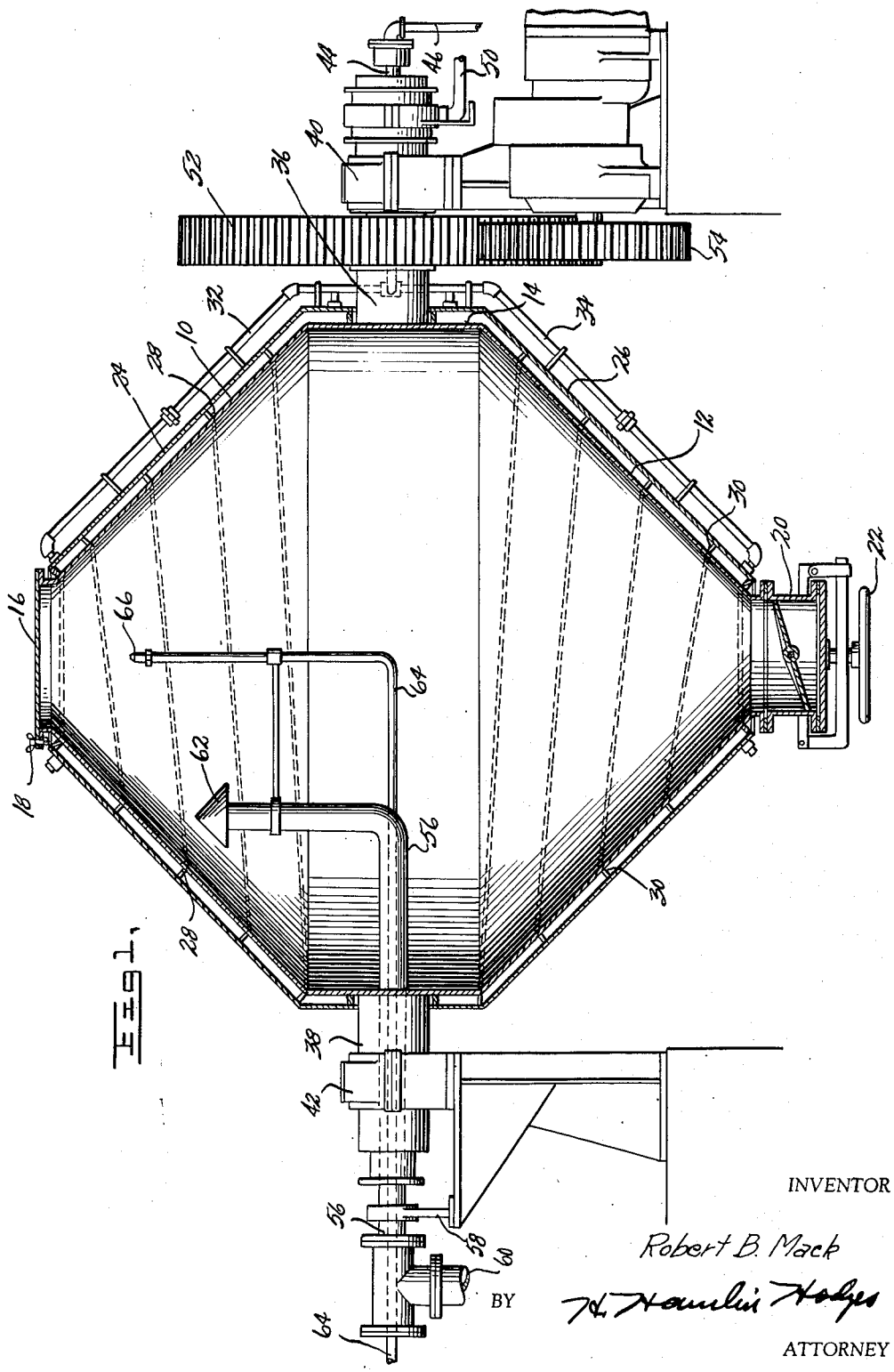
Fig. 1 is a longitudinal cross-section.

The blender is preferably composed of two truncated cones 10 and 12 which are welded or otherwise suitably secured to a cylindrical belt 14 at their respective widest ends. At the narrow end of truncated cone 10, I provide a convenient man hole having a hinged cover 16 which may be suitably maintained in a closed position by thumb nuts 18 or the like. At the smaller end of the truncated cone 12, I provide a conventional discharge opening 20 which may be opened and closed by suitably operating the hand wheel 22.

The truncated cones 10 and 12 are covered by the jackets 24 and 26 respectively. The jackets 24 and 26 are spaced apart from the truncated cones 10 and 12 by continuous and spirally positioned baffle plates 28 and 30 respectively. Inlet pipes 32 and 34 are suitably fixed to communicate with the space provided between the truncated cone 10 and its jacket 24, and the truncated cone 12 and its jacket 26 respectively. The assembled truncated cones 10 and 12 and their jackets 24 and 26 as well as the cylindrical belt 14 are supported on trunnions 36 and 38 properly supported in journals 40 and 42.

The trunnion 36 is axially drilled to provide an inlet channel 44 which, at its end remote from the trunnion, may be suitably connected to an inlet pipe 46 to be secured to a source of supply of any desired heating or cooling media. The trunnion 36 is also provided with an axial channel 48 which may be suitably connected with an exhaust pipe 50 for the disposal and/or reuse of the heating or cooling media.

On the periphery of the trunnion 36, a suitable drive gear 52 is attached and is adapted to mesh with the teeth of the gear 54 suitably secured to a conventional motor or other rotary power output.

The trunnion 38 is substantially different from the trunnion 36 described above, and is not only suitably bearinged within the journal 42, but is also journaled upon a vacuum pipe 56 which passes completely therethrough and preferably extends inwardly within the truncated cone 10. The vacuum pipe 56 is maintained in its desired position by being fixedly secured to a suitable support 58 mounted on the same stanchion which supports the journal 42. The pipe 56 is additionally in its fixed position by securing to the end thereof a suitable vacuum line connection 60. At the end of the pipe 56 within the truncated cone 10, a suitable hood 62 is secured to cover the open end of the vacuum pipe 56.

Passing axially through the horizontal portion of the pipe 56, I provide a spray or jet pipe 64 which preferably is adapted to be bent upwardly within the truncated cone 10 and be supported in a position parallel to the upwardly bent vacuum pipe 56. At the innermost end of the spray or jet pipe 64, I provide a removable and adjustable nozzle 66.

In the modified form disclosed in Fig. 6, the trunnion 38 and its journal 42 are substantially identical with those in the preferred form. In this modified form the vacuum pipe 56 is provided with a flange 68 to which an end pipe 70 may be bolted or otherwise suitably secured. The end pipe 70 will not, however, be provided with a hood over its end within the truncated cone 10, but will be left open for the passage therethrough of a straight jet or spray pipe 64.

Having the vacuum pipe 56 and the jet or spray pipe 64 in a horizontal position within the conical blender, it is necessary that the vacuum be attached to extend upwardly, as the coupling pipe 72 on the outside of the trunnion 38. By such provision, dry material within the blender will not be sucked downwardly therefrom by the vacuum.

The modified form may be conveniently used for dispersion operations necessitating repeated changes of color spray or the like. Having a removable vacuum pipe and/or spray or jet pipe, they may be readily removed from the blender and be replaced by others without necessitating the complete removal of the material being dispersed.

It will be understood that by the use of my conical blender, any desired liquid may be suitably added to a dry material being blended. If desired, a selected dry material may be inserted within the blender while its liquid contents are being blended. Also the blending and dispersing operation may be conducted within the blender while the same is subjected to any desired heating or cooling. Any desired change may be effected at the time when the blender is in full operation.

I claim:

1. A blender having generally frusto-conical terminal portions joined at their bases by an interposed generally cylindrical portion, the axes of the terminal and intermediate portions being aligned, means mounting the said blender for rotation about an axis transverse to the said aligned axes, a jacket enclosing the said frusto-conical and cylindrical portions, means near one end of the said second mentioned axis introducing a temperature regulating fluid into the said jacket, means at the same said end emitting the said fluid from the said jacket, a vacuum pipe extending into the said blender near the end of the said second mentioned axis remote from the fluid introduction end of said jacket, and a spray pipe passing axially through the said vacuum pipe into the said blender.

2. A blender having generally frusto-conical terminal portions joined at their bases by an interposed generally cylindrical portion, the axes of the terminal and intermediate portions being aligned, means mounting the said blender for rotation about an axis transverse to the said aligned axes, a jacket enclosing the said frusto-conical and cylindrical portions, means near one end of the said second mentioned axis introducing a temperature regulating fluid into the said jacket, means at the same said end emitting the said fluid from the said jacket, a vacuum pipe extending into the said blender near the end of the said second mentioned axis remote from the fluid introduction end thereof, and a spray pipe passing axially through the said vacuum pipe into the said blender, the said spray pipe being directly removable from the said blender.

3. A blender having generally frusto-conical terminal portions joined at their bases by an interposed generally cylindrical portion, the axes of the terminal and intermediate portions being aligned, a plurality of trunnion means mounting the said blender for rotation about an axis transverse to the said aligned axes, a jacket enclosing the said frusto-conical and cylindrical portions, inflow and exhaust pipes passing through one of the said trunnions and communicating with the said jacket, one at each end thereof, a non-rotatable vacuum pipe extending into the blender and passing through the opposite trunnion, and a removable spray pipe passing through the said vacuum pipe and terminating within the said blender.

4. A blender having generally frusto-conical terminal portions joined at their bases by an interposed generally cylindrical portion, the axes of the terminal and intermediate portions being aligned, a plurality of trunnion means mounting the said blender for rotation about an axis transverse to the said aligned axes, a jacket enclosing the said frusto-conical and cylindrical portions, inflow and exhaust pipes passing through one of the said trunnions and communicating with the opposite ends of the chamber formed by the said jacket, a non-rotatable vacuum pipe extending into the blender and passing through the opposite trunnion, and a spray pipe passing through the said vacuum pipe and terminating within the said blender, the said spray pipe being removable through the said vacuum pipe.

ROBERT B. MACK.

REFERENCES CITED

The following references are of record in the file of this patent:

UNITED STATES PATENTS

| Number | Name | Date |
| --- | --- | --- |
| 436,975 | Gibson | Sept. 23, 1890 |
| 685,243 | Atwood | Oct. 29, 1901 |
| 925,833 | Peck | June 22, 1909 |
| 1,941,329 | Trudel | Dec. 26, 1933 |
| 2,477,269 | Sandler | July 26, 1949 |